United States Patent [19]

West

[11] 4,259,810
[45] Apr. 7, 1981

[54] TRANSIT VEHICLE DOOR CONTROL APPARATUS

[75] Inventor: Harold E. West, North Huntingdon, Pa.

[73] Assignee: Westinghouse Electric Corp., Pittsburgh, Pa.

[21] Appl. No.: 60,450

[22] Filed: Jul. 25, 1979

[51] Int. Cl.³ .............................................. E05C 7/06
[52] U.S. Cl. .................................... 49/118; 49/123; 474/86; 474/169; 474/171
[58] Field of Search ........................ 49/118, 123, 121; 74/230.11, 230.5, 230.3, 230.01, 230.13

[56] References Cited

U.S. PATENT DOCUMENTS

| 503,361 | 8/1893 | DeVry | 49/123 |
| 1,966,182 | 7/1934 | McCormick | 49/123 |
| 2,174,524 | 10/1939 | Nisbet | 49/118 X |
| 2,235,381 | 3/1941 | McCormick | 49/123 X |
| 2,318,090 | 5/1943 | McCormick | 49/123 X |
| 4,142,326 | 3/1979 | Schmitz | 49/123 X |
| 4,143,757 | 3/1979 | Wallenfang | 74/230 X |

FOREIGN PATENT DOCUMENTS 2337284 7/1977 France ................................ 74/230.11

Primary Examiner—Philip C. Kannan
Attorney, Agent, or Firm—R. G. Brodahl

[57] ABSTRACT

There is disclosed a door motion control apparatus for the passenger entry and exit doors of a mass transit vehicle, which passenger entry and exit doors are opened by a drive motor when the vehicle is stopped at a desired location for passenger entry and exit within a station.

12 Claims, 8 Drawing Figures

U.S. Patent  Apr. 7, 1981  Sheet 1 of 5  4,259,810
FIG.1
PRIOR ART
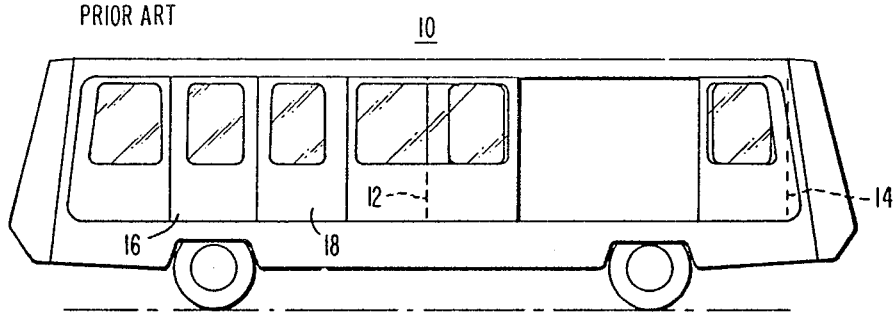
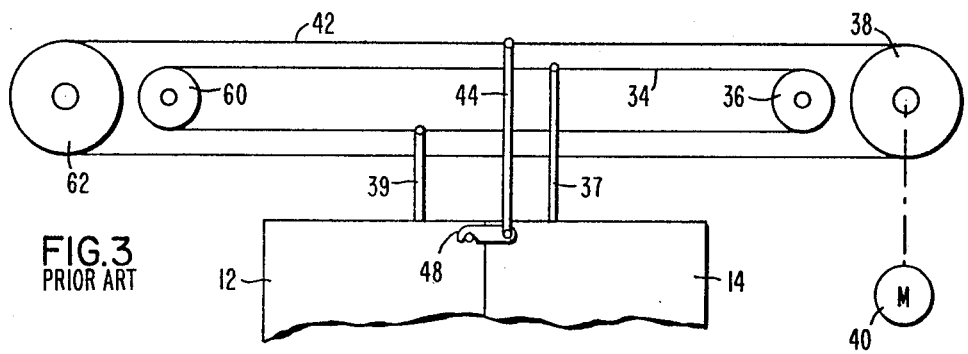
FIG.3
PRIOR ART
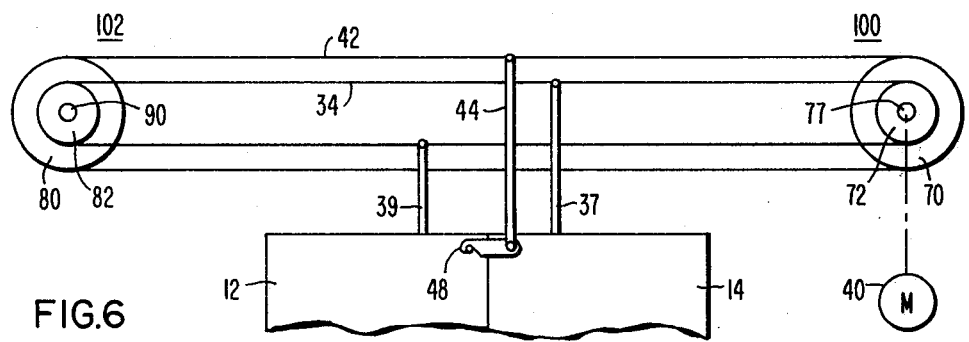
FIG.6

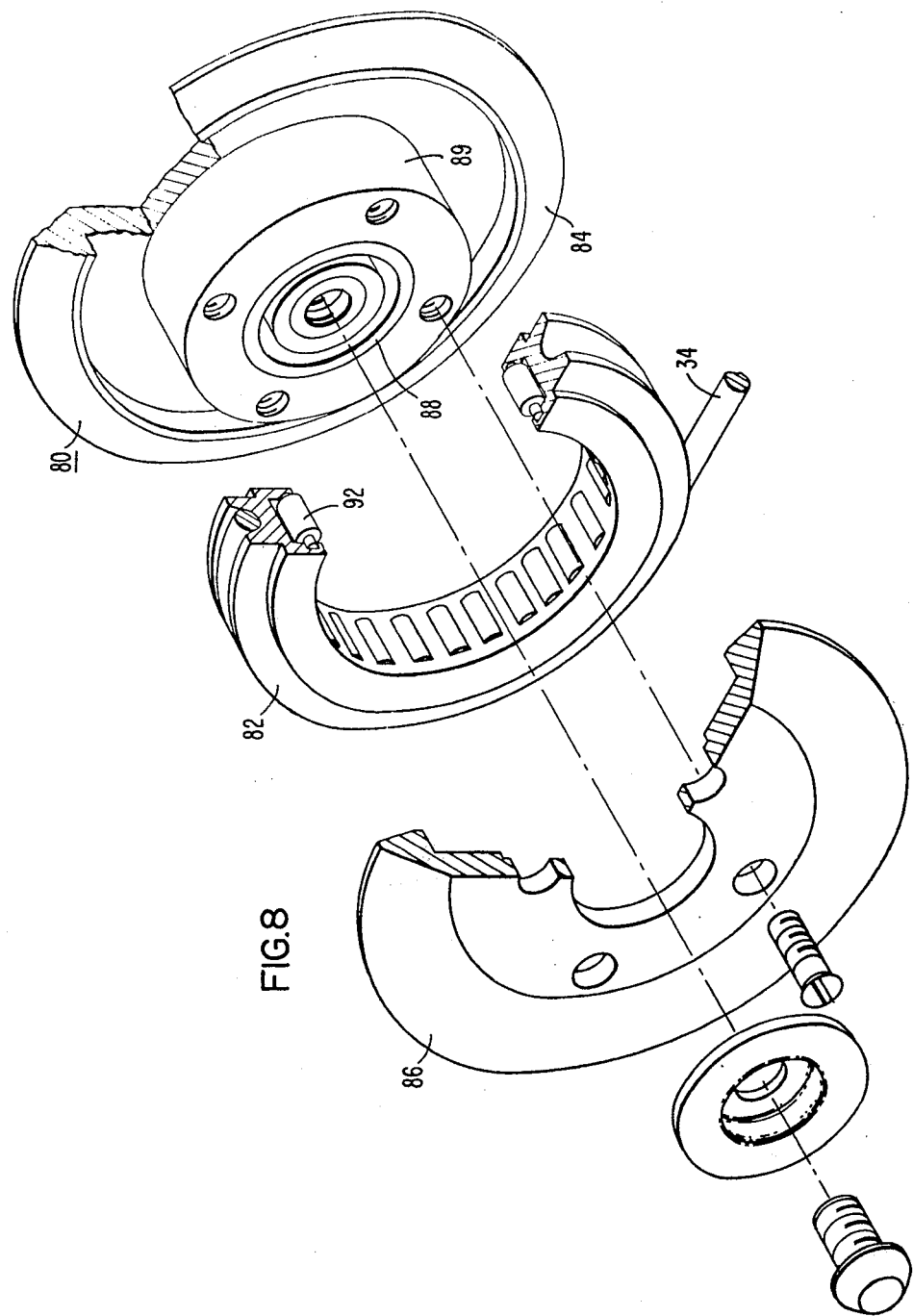

TRANSIT VEHICLE DOOR CONTROL APPARATUS

BACKGROUND OF THE INVENTION

It is known to operate a mass transit vehicle in conjunction with an automatic vehicle control system and to operate the passenger doors of such a vehicle with suitable door command signals. It is necessary to sense when the vehicle is stopped at a station platform before the door open signal causes the passenger doors to open for the exit and entry of passengers. In addition as described in a published article entitled Automatic Train Control Concepts are implemented by modern equipement at pages 145 through 151 of the Westinghouse Engineer for September 1972 the vehicle door controls can be interlocked with vehicle zero speed detection to prevent automatic door opening before the vehicle has come to a stop.

A requirement of transit expressway and rapid transit vehicle door operation is that each door should be mechanically locked in a closed position before the vehicle is allowed to move along the track. It is known for this purpose to provide motion control apparatus for controlling double doors simultaneously as shown in U.S. Pat. No. 4,142,326 assigned to the same assignee as the present invention.

SUMMARY OF THE INVENTION

The present invention provides a transit vehicle door motion control apparatus providing a linear door control force over the distance of the intended door travel. The drive member operates to move one door in response to the door movement force and the other door is coupled to the one door to move in conjunction with that one door.

A double pulley assembly is utilized as part of and to provide a more compact transit vehicle door movement and control apparatus, with that pulley assembly being mounted for rotation about a common support shaft. The inner pulley member is operative with a drive member such as a cable having a cross sectional dimension smaller than a provided opening in the outer pulley support groove for the larger drive member such as a Vee belt, such that the smaller drive member passes through the outer pulley belt support groove and operates with the cable support groove on the inner pulley member.

BRIEF DESCRIPTION OF THE DRAWINGS

FIG. 1 is a side view of a prior art mass transit vehicle to show the passenger doors in an open position and in a closed position;

FIG. 3 shows schematically the door motion control operation of the prior art apparatus shown in FIG. 2;

FIG. 6 shows schematically the door motion control apparatus of the present invention including a double pulley apparatus at each end of that door motion control apparatus;

FIG. 8 shows an exploded isometric view of the double pulley apparatus shown in FIG. 5 and utilized at the other end of the door motion control apparatus shown in FIG. 6.

DESCRIPTION OF THE PREFERRED EMBODIMENT

In FIG. 1 there is shown a mass transit vehicle 10 including a first pair of passenger doors 12 and 14 in open position and a second pair of passenger doors 16 and 18 in closed position.

Figure 2:
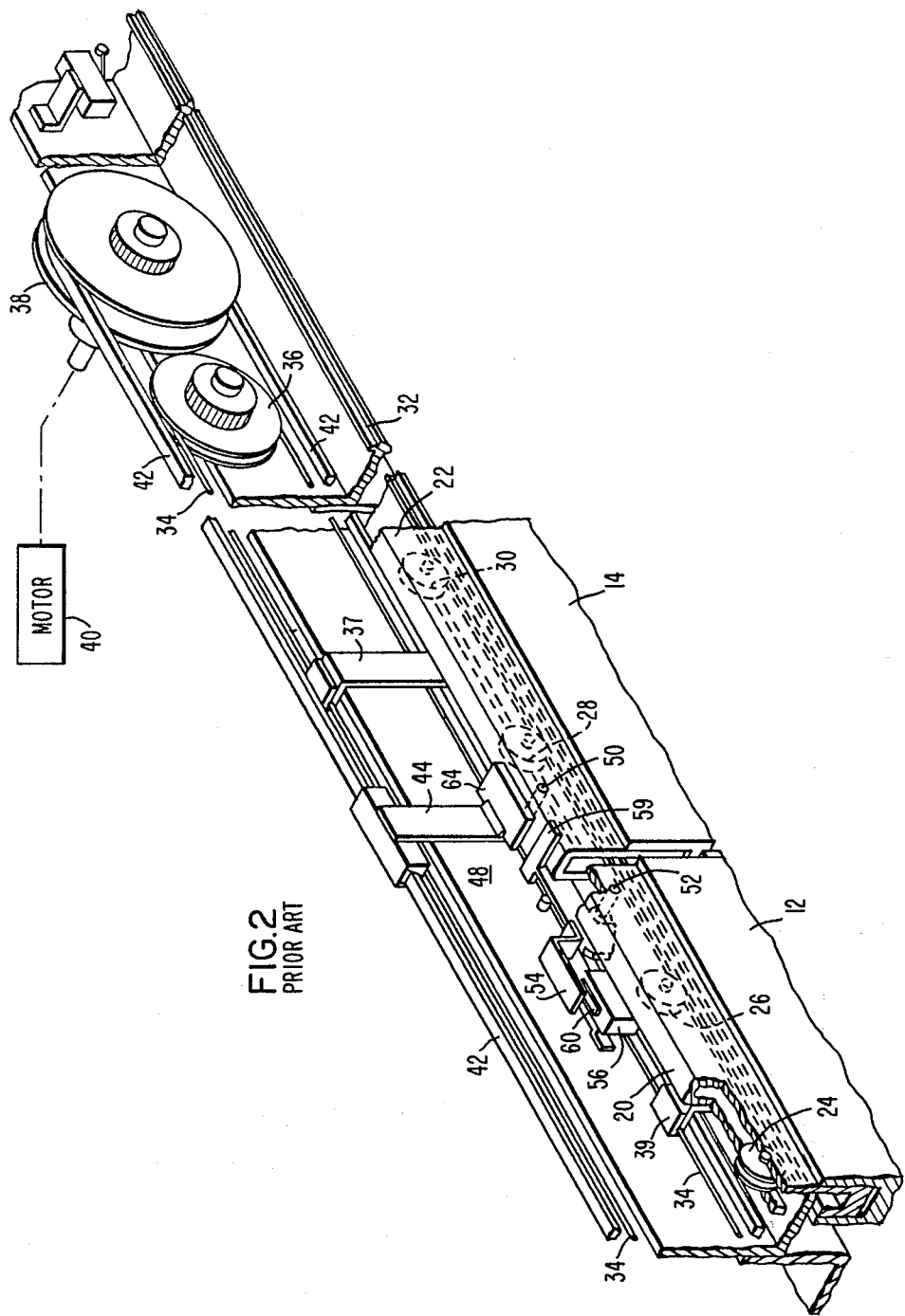
FIG. 2 is a perspective view to show a prior art motion control apparatus for a pair of bi-parting passenger doors.

In FIG. 2 there is shown the transit vehicle door motion control apparatus of U.S. Pat. No. 4,142,326, including respective carriers 20 and 22 for the first pair of bi parting passenger doors 12 and 14. The carrier 20 is supported by rollers 24 and 26 and the carrier 22 is supported by rollers 28 and 30, which rollers operate on an extruded track member 32. The bottom of each passenger door 12 and 14 is guided in a suitable retaining slot member not shown and which constrains the bottom of the door to move parallel to the top of the door. A drive cable 34 which can be a metal wire cable coated with nylon is looped around an idler pulley 36 and a similar idler pulley not shown at the left of FIG. 2. The drive cable 34 is connected through fastener 37 to move the passenger door 14 and is connected to passenger door 12 through the fastener 39 to move the passenger door 12, and to open the passenger doors 12 and 14 or to close the passenger doors 12 and 14 together. A drive pulley 38 is operative with a drive motor 40 and a drive belt member 42, which can be a well known Vee belt, is connected through the drive arm 44 for supplying a door movement and door unlatching force to the passenger door 14. The drive member 42 provides a linear translation force to move the door 14 through its desired travel to the right as shown in FIG. 2 for the purpose of separating or opening the passenger doors 12 and 14 and to the left for the purpose of closing the passenger doors 12 and 14. The same force that moves the door 14 open and closed also unlocks and locks the lock mechanism 46 including the latch hook 48. When the motor 40 is not energized and the passenger doors 12 and 14 are closed, the doors 12 and 14 cannot be opened by applying an opening force directly to either door 12 or 14 or both. However when the door opening force is applied by the drive member 42 to the lock mechanism 46 the latter will unlock and the door 14 will move to the right as shown in FIG. 2.

In FIG. 3 there is shown schematically the door motion control apparatus shown in FIG. 2 including the drive cable 34 and the drive belt member 42. The idler pulley 36 operative with the drive cable 34 and the drive pulley 38 operative with the drive belt member 42 are shown to the right end of the apparatus illustrated in FIG. 3. At the left end of the apparatus there is provided an idler pulley 60 operative with the drive cable 34 and an idler pulley 62 operative with the drive belt member 42. The fastener 37 is connected between the drive cable 34 and the passenger door 14. The fastener 39 is connected between the drive cable 34 and the passenger door 12. The drive arm 44 is connected between the drive belt member 42 and the passenger door 14, and controls the operation of the latch hook 48 for applying a door movement and door unlatching force to the passenger door 14. The disclosure of U.S. Pat. No. 4,142,326 is incorporated herein by reference to provide a more detailed description of the operation of the prior art transit vehicle door motion and control lock apparatus shown in FIGS. 2 and 3.

Figure 4:
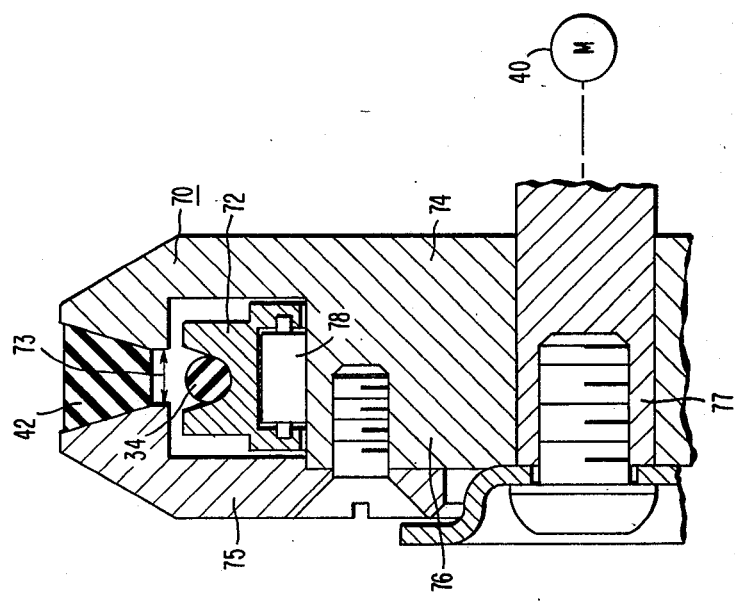
FIG. 4 shows a first embodiment of the double pulley apparatus included in the door control apparatus of the present invention.

In FIG. 4 there is shown a first embodiment of the double pulley apparatus included in the door control apparatus of the present invention. An outer drive pulley member 70 is cooperative with an inner idler pulley member 72. A drive cable 34 operates with the inner pulley member 72 and passes through an opening 73 between the first portion 74 of the outer pulley member 70 and a second portion 75 of the outer pulley member 70. The first porton 74 includes an extension 76 which is coupled with a support shaft 77, which support shaft 77 can be operative with a drive motor 40. The inner pulley member is supported by a bearing 78 carried by the extension 76 of the first portion 74 such that the inner pulley member 72 can rotate on the support bearing 78 in relation to the extension 76 and the outer pulley member 70.

Figure 5:
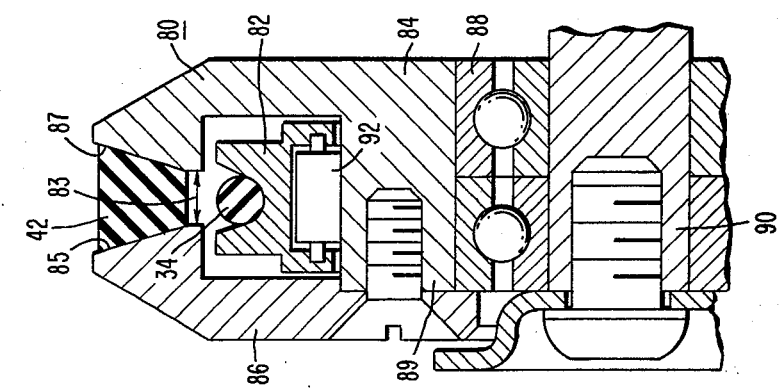
FIG. 5 shows a second embodiment of the double pulley apparatus included in the door control apparatus of the present invention.

In FIG. 5 there is shown a second embodiment of the double pulley apparatus included in the door control apparatus of the present invention, including the outer puley member 80 and the inner pulley member 82. The drive cable 34 operates with the inner pulley member 82 and passes through the opening 83 between the first porton 84 of the outer pulley member 80 and the second porton 86 of the outer pulley member 80. The first portion 84 includes an extension 89 which operates with a provided bearing member 88 in relation to a support shaft 90 to permit rotation of the outer pulley member 80 supported by the bearing 88 and in relation to the support shaft 90. The inner pulley member 82 is supported by a bearing 92 carried by the extension 89 of the outer pulley member first portion 84 such that the inner pulley member 82 can rotate on the support bearing 92 in relation to the extension 89 of the first portion 84 of the outer pulley member 80.

In FIG. 6 there is shown the door motion control apparatus of the present invention including a double pulley apparatus at each end of that door motion control apparatus. More specifically at the right end of the apparatus as shown in FIG. 6 there is provided a double pulley apparatus 100 such as shown in FIG. 4 and including the outer pulley member 70 coupled with the motor 40 and operative with the drive belt 42. The inner pulley member 72 is operative with the drive cable 34 and rotatable about the common support shaft 77.

At the left end of the apparatus as shown in FIG. 6 there is shown a double pulley apparatus 102, such as shown in FIG. 5 and including the outer pulley member 80 operative with the drive belt 42 and the inner pulley member 82 operative with the drive cable 34 and rotatable about a common support shaft 90.

Figure 7:
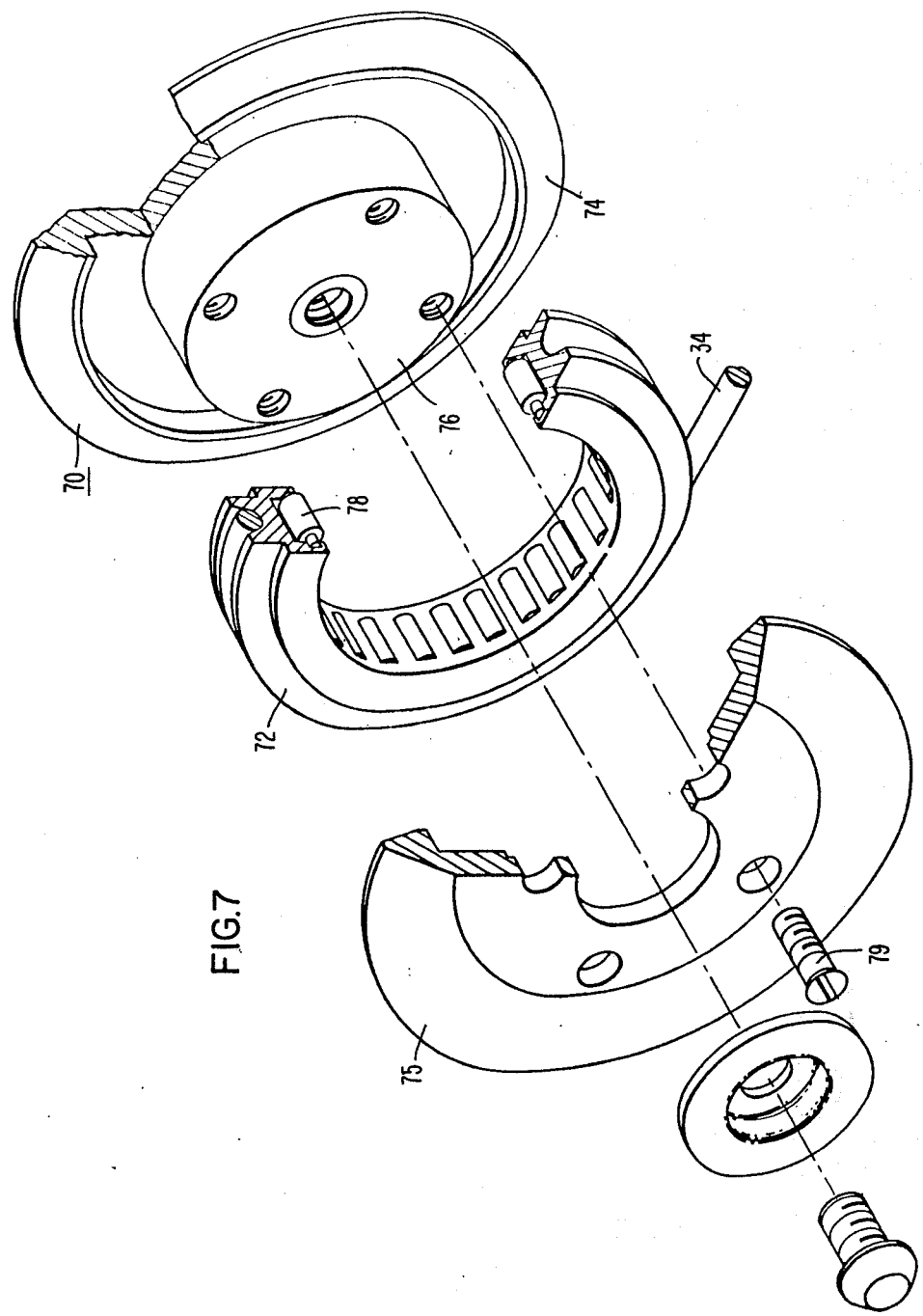
FIG. 7 shows an exploded isometric view of the double drive outer pulley apparatus shown in FIG. 4 and utilized at one end of the door motion control apparatus shown in FIG. 6.

In FIG. 7 there is shown an expanded isometric view of the double pulley apparatus shown in FIG. 4 and utilized at the right end of the door motion control apparatus shown in FIG. 6. The double pulley apparatus includes a first portion 74 and a second portion 75 of the outer pulley member 70 and which are fastened together by a plurality of suitable screws 79 or suitable like members. The inner pulley member 72 rotates on the bearing 78 in relation to the extension 76 of the first portion 74.

In FIG. 8 there is shown an expanded isometric view of the couble pulley apparatus shown in FIG. 5 and utilized at the left end of the door motion control apparatus shown in FIG. 6. The double pulley apparatus includes a first portion 84 and a second portion 86 of the outer pulley member 80. The inner pulley member 82 is operative with bearing 92 for rotation about the extension 86 of the first portion 84. The outer pulley member 80 is operative with the bearing 88 for rotation about the support shaft.

The respective double pulley assemblies shown in FIGS. 4 and 5 were required because the available space for the door motion control apparatus illustrated in FIG. 6 was very limited and a very compact design was required. For the apparatus shown in FIG. 4 the bearing member 78 supports the inner pulley member 72. For the apparatus shown in FIG. 5 the bearing 88 supports the outer pulley member 80 and the bearing 92 supports the inner pulley member 82. The pulleys are aligned as required for the drive cable 34 to pass through the open bottom of the outer pulley member. The normal Vee drive belt 42 does not touch the bottom of the pulley groove in the outer pulley member but operates primarily with the sides of the pulley groove. The drive cable 34 is small enough to pass through the open bottom of the outer pulley groove established by the sides and operates with the inner pulley member nested between the first portion and the second portion of the outer pulley member.

The bearing 88 shown in FIG. 5 supports the outer pulley member 80 to give a relatively wide support surface to keep the outer pulley member 80 from tilting in relation to the support shaft 90. The inner pulley member 82 operates with its individual support bearing 92 and in actual practice the drive cable 34 operating in relation to the opening 83 of the outer pulley member 80 operates to retain the inner pulley member 82 in the position as shown in FIG. 5.

The outer pulley member 70 of FIG. 4 can be keyed to the support shaft 77 which support shaft could be the output shaft of a drive motor 40. At the drive end of the door motion control apparatus shown to the right in FIG. 6, the inner pulley member 72 operates as an idler pulley in relation to the outer pulley member 70 operating as a drive pulley to apply force to the drive belt 42. At the idler end of the door motion control apparatus shown to the left in FIG. 6, both the inner pulley member 82 and the outer pulley member 80 operate as idler pulleys.

I claim:

1. In door control apparatus coupling a drive motor for controlling the movement of biparting passenger doors of a transit vehicle, the combination of:
   first pulley means suitable for connection with said drive motor,
   second pulley means positioned within the first pulley means and supported by the first pulley means for rotation in relation to that first pulley means,
   a first door movement control means cooperative with the first pulley means and connected to a first of said doors,
   A second door movement control means operative with the second pulley means and connected to each of the first and the second of said doors, such that when the first door moves in one direction away from the second door then the second door moves in the opposite direction away from the first door.

2. The door control apparatus of claim 1, with the first pulley means including a first portion and a second portion, such that the second pulley means is positioned between said first and second portions of the first pulley means.

3. The door control apparatus of claim 1, with the first pulley means including an opening through which the second door movement control means passes for operation with the second pulley means.

4. The door control apparatus of claim 1 including a support shaft coupled with the drive motor, with the first pulley means being operative with the support shaft to drive the first door movement control control means.

5. The door control apparatus of claim 1, including bearing means supporting the second pulley means for rotation within the first pulley means.

6. In double pulley apparatus operative with a drive motor for moving a first load in relation to a second load, the combination of:
first continuous drive means operative with the first load,
second continuous drive means operative with the second load,
first pulley means including a coupling operative with said drive motor and cooperative with the first drive means for controlling the movement of the first load, and
second pulley means positioned within the first pulley means and rotatable in relation to the first pulley means, with the second pulley means being cooperative with the second drive means for controlling the movement of the second load in relation to the movement of the first load.

7. The double pulley apparatus of claim 6, with the second drive means comprising a cable member that passes through the first pulley means for operation with the second pulley means.

8. The double pulley apparatus of claim 6, with the first pulley means having a peripheral opening through which the second drive means can operate with the second pulley means.

9. The double pulley apparatus of claim 6, with the first pulley means including a first portion and a second portion between which the second pulley means is positioned.

10. The double pulley apparatus of claim 6, with the drive motor operating through an output shaft,
said first pulley means being coupled with said output shaft and said second pulley means being supported by the first pulley means.

11. On a double pulley apparatus for generation with a support shaft, the combination of
first pulley means including a coupling operative with said support shaft and rotatable with said support shaft, with said first pulley means having a first portion and a second portion which are connected together,
bearing means coupled with said first portion, and
second pulley means rotatable supported by said bearing means and positioned between said first and second portions for rotation in relation to said support shaft.

12. The double pulley apparatus of claim 11, with the rotation of the second pulley means being independent of the rotation of the first pulley means.

* * * * *